Patented Mar. 20, 1928.

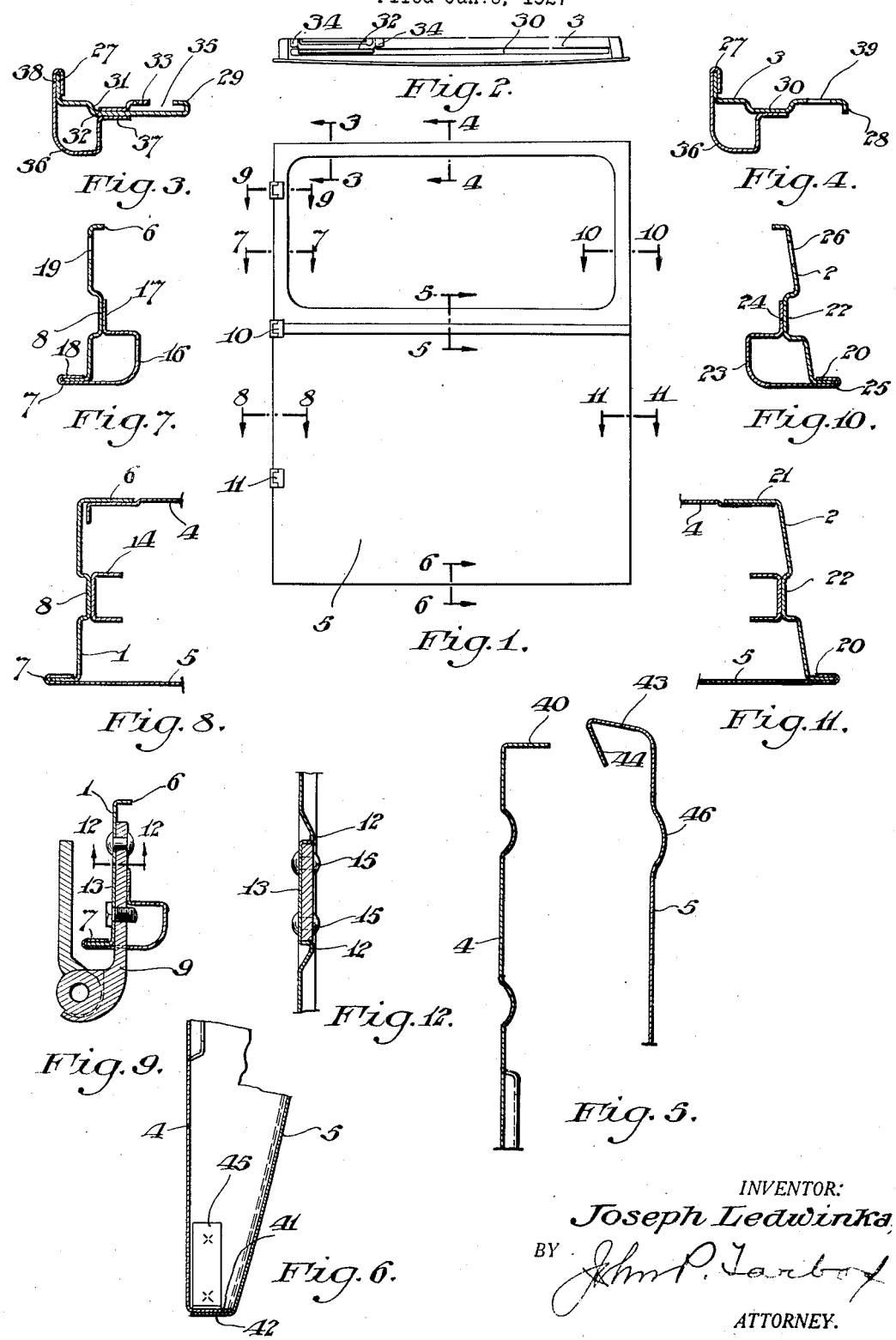

1,663,518

UNITED STATES PATENT OFFICE.

JOSEPH LEDWINKA, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA.

PRESSED-METAL VEHICLE DOOR.

Application filed January 8, 1927. Serial No. 159,828.

This invention relates to a door construction for automobile bodies. More particularly, it relates to a pressed metal door construction adapted to be used upon closed automobile bodies of either the all-metal or composite type, and also its adaptation for use upon open types of bodies is well within the contemplation thereof.

The primary object of the invention is to provide a door construction for closed automobile bodies which is of simple design, permitting the parts to be readily formed by stamping operations, and wherein the rails are of such formation that the door is strengthened, convenient anchorages for the hinges are provided, and the whole construction readily assembled.

Other objects and advantages will become apparent from time to time as the description proceeds.

An embodiment of this invention is illustrated in the accompanying drawings, wherein—

Fig. 1 shows the door in side elevation;

Fig. 2 is a top plan view thereof;

Figs. 3 and 4 are sections through the top rail taken on line 3—3 and 4—4, respectively, of Fig. 1;

Fig. 5 is a section through the central portion of the door at the belt line taken on line 5—5 of Fig. 1;

Fig. 6 is a section through line 6—6 of Fig. 1;

Figs. 7, 8 and 9 are sections through the hinge rail of the door, on lines 7—7, 8—8 and 9—9, respectively, of Fig. 1;

Figs. 10 and 11 are sections through the jamb rail taken on lines 10—10 and 11—11, respectively, of Fig. 1, and Fig. 12 is a section taken on line 12—12 of Fig. 9.

In designing and constructing doors for closed automobile bodies, the present aim is to reduce the cross section of the rails as much as possible in order to increase to a maximum the range of vision from the interior of the body. This reduction of the rails is dependent upon the maintenance of the necessary strength in the door structure. The construction illustrated in the drawing, and now to be described herein, not only permits of this maximum range of vision, but also presents a structure possessing the required strength in addition to the objects enumerated above.

The door comprises, in general, a hinge rail, 1, a jamb rail 2, a top rail 3, an inner panel or lock board 4, and an outer panel 5. The hinge rail 1 is a metal stamping of substantially Z-shape in cross section, the arm 6 of which is located on the inside of the door and extends inwardly thereof, while the arm 7 is on the outside of the door and extends away from the same. The arm 6 is of uniform width from the bottom of the door to the belt line thereof, but from this point to the top of the door it is of greatly diminished width, in fact being merely an inturned flange. The rail is provided with a channeled inwardly-offset portion 8 arranged centrally thereof and extending longitudinally betwen the upper and the middle hinges 9 and 10 and the middle and the lower hinges, 10 and 11. One of the main functions of this channeled offset is to strengthen the rail, and it should be understood that the same could be extended above and below the upper and lower hinges if desired. The depth of the offset 8 is substantially equal to the breadth of the arm 6 above the belt line, the purpose of this becoming apparent later.

Where it is desired to attach a hinge bracket, the rail 1 is provided with transversely-extending inward offsets 12 so spaced as to accommodate a hinge therebetween. These offsets are joined by a plane portion 13 which lies in the same plane as the rail, and the hinge is thus surrounded on three sides and located interiorly of the rail. It should be observed that the inward offsets 12 are equal in depth to the longitudinally-extending inward offsets 8 and that this arrangement allows the hinge rail to have, except for these offsets, a plane exterior surface and permits the glass run channel 14 to be secured upon the offset 8. The hinge, being supported on three sides by the rail, is prevented from sagging or weaving, and the means that accomplishes this likewise strengthens the rail at these points where it is particularly necessary to take care of the strains imposed by the swinging open or closed of the door. It is also apparent that by having the hinge bracket arranged within the rail and projecting outwardly through the paneling that this rail may lie closely adjacent the door post. The hinge bracket may be secured in position by rivets 15 or other suitable securing means. In Figure 9 the arrangement just described is illustrated, the hinge bracket 9 in this instance being the top hinge, although, of course, the other hinges are fastened to the rail in the same manner.

An outer window paneling or molding 16 is secured to the rail 1 by having one end 17 flanged inwardly of the door so as to lie against the offset 8 and be welded or otherwise fastened thereto, while the other end 18 is flanged around the arm 7 of the rail, as clearly shown in the drawing. The rail is provided above the belt line with spaced openings 19 arranged between the offset 8 and the inner arm 6 through which the securing means for the removable inner window molding or retaining strips pass.

The jamb rail 2 is likewise a metal stamping substantially Z-shaped in cross section having an outer arm 20 and an inner arm 21 which, like the arm 6 of the hinge rail, is greatly diminished in width above the belt line of the door. The jamb rail differs from the hinge rail in that the main arm thereof is inclined instead of being perpendicular to the arms 20 and 21, and the longitudinal, inwardly-offset channel 22 (corresponding to channel 8) extends substantially the full length of the rail, except where the lock mechanism is arranged. The outer window paneling or molding 23 has an inwardly-extending flange 24 secured to the offset 22 and the opposite end 25 flanged around the arm 20 in the same manner that the molding 16 is attached to the hinge rail. Openings 26 are arranged in the rail above the belt line to receive the securing means for the removable inner window molding or retaining strip.

The upper rail 3 is likewise a stamping substantially Z-shaped in cross section having an outer upwardly-projecting arm 27 and an inner downwardly-projecting arm 28, which extends substantially the full length of the rail. However, this inner arm 28 adjacent one end is bent upwardly and inwardly, as shown at 29, for a purpose later to become apparent. The rail is also formed with a longitudinally-extending offset channel 30 substantially coextensive with the downwardly-extending arm 28 and the same depth therewith. The rail from the end of the offset channel 30 is downwardly offset at 31, this offset being in alignment with, and an extension of, the outer wall of the channel 30 and the same depth therewith, the rail inwardly from this offset being of plane formation. A member 32 is secured to the rail with one edge thereof contiguous to the offset 31 and the other end upwardly offset so as to provide an inwardly-extending portion 33 in alignment with but spaced from the inturned arm 29 of the rail. The distance between the portion 33 and the rail is equal to the depth of the offset 31. The member 32 has inwardly-projecting offset feet 34 welded or otherwise secured to the top rail. It is thus seen that a slot 35 is provided for containing the sliding portion of a door stop mechanism.

An outer window molding or retaining strip 36 is secured to the top rail in the same manner as the similar elements are secured to the side rails, the flange 37 to the offset portions 30 and 31, and the edge 38 flanged around the arm 27. Spaced openings 93 are likewise provided in the rail through which the securing means for the removable inner retaining strip or molding pass.

In assembling the rails into the complete door structure, the top corner joints are formed by flanging the web of the side rails inwardly over the web of the top rail and welding thereto the flanges thus formed. The corners of the outer window-retaining paneling or molding are braced by flanged gusset plates (not shown) welded thereto and to the rails.

The inner panel 4 has its opposite vertical edges inwardly offset so as to lie on the inside of the arms 6 and 21 of the side rails to which it is secured. This panel may be provided with such indentations, cut-out portions, and the like, as are desired. The upper end of the panel is flanged inwardly at 40 and the lower edge inwardly at 41 (with respect to the door).

The outer panel 5 has its opposite vertical edges flanged around the arms 7 and 20 of the side rails and its lower edge inwardly flanged at 42. The upper edge is inwardly flanged at 43 and downwardly flanged at 44 in the usual manner. The lower edges of both panels have their flanges 41 and 42 secured together in overlapping relationship, the flange 42 being on the outside of the flange 41. Angle brackets 45 are secured to the webs of the side rails and to the flanges 41 and 42, thereby effectively providing a strong joint along the bottom of the door. If desired, in order to conform to the general design of the body, the outer paneling may be provided with a beading 46.

It is apparent that a door construction according to that described comprises rails of a minimum cross section, provides great strength because of the inwardly offset channels in the rails, effects a connection for the hinges that is unusually strong and at the same time strengthens the rail at the point of connection, presents a simple and effective manner of securing the door stop mechanism to the top rail, and is of such design that the elements thereof may be readily stamped from metal and efficiently assembled.

The various modifications and adaptations which the invention may take are only limited by the scope of the appended claims.

I claim:

1. In a pressed metal door construction for automobile bodies, a side rail having transversely-extending inward off-sets arranged in spaced vertical relationship and connected together by a portion of the rail which is in the same plane as those portions thereof above and below the offsets whereby a hinge bracket may be arranged interiorly of the rail between the spaced offsets.

2. In a pressed metal door construction for automobile bodies, a side rail having transversely-extending offsets adapted to receive a hinge bracket therebetween and longitudinally extending offsets adapted to strengthen the rail and to receive a glass run channel, said longitudinal offsets being of a depth substantially equal to the depth of the transverse offsets, whereby the base of the run channel and the inner surface of the bracket are in vertical alignment.

3. In a pressed metal door construction for automobile bodies, a side rail having spaced transversely-extending offsets adapted to receive a hinge bracket therebetween, and a longitudinally-extending offset adapted to strengthen the rail, the depth of said transverse offsets being substantially the same as the depth of the longitudinally-extending offset.

4. In a pressed metal door construction for automobile bodies, side and top rails of substantially Z-shape having longitudinally-extending inward offsets formed therein substantially equal in depth to the width of the inner arm of the rails above the belt line of the door.

5. In a pressed metal door construction for automobile bodies, side rails having main transverse portions of web cross section having longitudinally-extending, inwardly offset portions between the edges, and glass run channels secured to said offset portions.

6. In a pressed metal door construction for automobile bodies, a substantially Z-shaped top rail having its inner arm upwardly and inwardly flanged adjacent one end thereof, and means cooperating with said upwardly and inwardly flanged portion for slidably housing a door stop mechanism.

7. In a pressed metal door construction for automobile bodies, a substantially Z-shaped top rail having an inwardly offset portion arranged to extend centrally and longitudinally thereof for the greater distance of the rail, said rail having one side inwardly offset the remaining distance thereof, the inner arm of said rail being downwardly-extending along that portion of the rail provided with the inward offset portion and upwardly and inwardly flanged the remaining distance thereof, and a member secured to the inwardly offset side of the rail and cooperating with said inwardly flanged inner arm to house a door-stop mechanism, the upper surfaces of said rail, member and arm being in horizontal alignment.

8. In a door construction for closed automobile bodies, an angular-shaped rail at a side of the window opening provided with an outer arm and a main transversely extending body portion of web cross-section having a longitudinally extending inwardly offset portion between the edges thereof, and an outer window molding having one edge secured to the inner side of said offset portion and the other edge flanged around the outer arm of the rail.

9. In a door for closed vehicle bodies, a pressed metal horizontal rail of web cross section having its inner edge turned back upon itself to form a guide for door stop mechanism.

10. In a door for closed vehicle bodies, a pressed metal horizontal rail comprising a transversely extending main portion of web cross section having, for a portion of its length, its inner portion offset and formed with a reversely bent edge portion and a member secured to said offset portion and having an offset portion cooperating with the reversely bent edge of the main portion to form a guide for a door stop mechanism.

11. In a door for closed vehicle bodies, a side rail having a door overlap flange and a transversely extending jamb face portion of substantially the width of the door, said jamb face portion being formed for the greater portion of its length and intermediate its edges with an inwardly extending offset of channel section.

In testimony whereof I hereunto affix my signature.

JOSEPH LEDWINKA.